United States Patent
Hekmatpour (10) Patent No.: US 6,647,513 B1
(45) Date of Patent: Nov. 11, 2003

(54) COVERAGE-BASED TEST GENERATION FOR MICROPROCESSOR VERIFICATION

(75) Inventor: Amir Hekmatpour, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,743

(22) Filed: May 25, 2000

(51) Int. Cl.⁷ .............................................. G06F 11/00
(52) U.S. Cl. .............................. 714/37; 714/47; 714/33
(58) Field of Search .............................. 714/39, 41, 37, 714/32, 25, 47, 33

(56) References Cited

U.S. PATENT DOCUMENTS

| | | | | |
|---|---|---|---|---|
| 5,926,622 A | * | 7/1999 | Hardin et al. | 714/33 |
| 5,951,705 A | * | 9/1999 | Arkin et al. | 714/738 |
| 5,978,934 A | * | 11/1999 | Gates | 714/41 |
| 5,996,102 A | * | 11/1999 | Haulin | 714/740 |
| 6,021,515 A | * | 2/2000 | Shimura | 714/738 |
| 6,035,420 A | * | 3/2000 | Liu et al. | 714/25 |
| 6,049,894 A | * | 4/2000 | Gates | 714/41 |

* cited by examiner

Primary Examiner—Nadeem Iqbal
Assistant Examiner—Timothy M Bonura
(74) Attorney, Agent, or Firm—Joseph P. Lally; Diana L. Roberts; Volel Emile (57) ABSTRACT

An integrated circuit verification method and system are disclosed. The method includes generating a test description comprising a set of test cases. The functional coverage achieved by the test description is then determined. The functional coverage achieved is then compared against previously achieved functional coverage and the test description is modified prior to simulation if the test description achieves no incremental functional coverage. In one embodiment, generating the test description comprises generating a test specification and providing the test specification to a test generator suitable for generating the test description. In one embodiment, the test description comprises a generic test description and the generic test description is formatted according to a project specification and simulation environment requirements. If the coverage achieved by the test description satisfies the test specification. In one embodiment, the functional coverage achieved by the test description is displayed in a graphical format. The test description is preferably added to a test database if the coverage achieved by the test description satisfies the test specification. The attributes and description of functional coverage achieved is added to the coverage database. Determining the functional coverage achieved by a test description may include estimating the coverage achieved based upon the test description, the test specification, and functional coverage model.

20 Claims, 4 Drawing Sheets

COVERAGE-BASED TEST GENERATION FOR MICROPROCESSOR VERIFICATION

BACKGROUND

1. Field of the Present Invention

The present invention generally relates to the field of integrated circuit functional verification and more particularly to a verification system and method that evaluate randomly generated tests based on the amount of functional coverage achieved relative to a given test specification prior to performing actual simulation.

2. History of Related Art

As the complexity of microprocessors and other complex integrated circuits has consistently increased over the years, the process of verifying each new design has accounted for an increasingly large percentage of the total resources required to design and manufacture a particular integrated circuit. Indeed, the verification of complex microprocessors with multiprocessing capability is now estimated to consume more time, labor, and other resources than the actual design of the integrated circuit.

Typically, functional verification is accomplished by generating a large number of test cases (test programs) developed manually by designers and verification engineers as well as with the help of various random and specific test generators and running these test programs on a simulator that attempts to mimic the operation of the microprocessor or other device. As the number of transistors, functions, registers, and other facilities in the integrated circuit have increased, conventional verification methods have responded by simply increasing the number of tests that are simulated. Unfortunately, generating a seemingly infinite number of tests is an inefficient and unreliable method of verifying the functionality of all components in the processor.

Typically, random test generators will generate a large number of test cases that are redundant from the perspective of the number of microprocessor states that are tested. In other words, random test generators tend to generate a large number of test cases that exercise the same or similar classes or closely related classes of functionality of the microprocessor despite cosmetic differences in the test cases. In the majority of verification activities, neither the custom (deterministic) test cases nor the randomly generated ones adequately address the interdependencies and interactions between system level components and functions.

In the early days of microprocessor development, inefficiencies in functional verification were tolerated because the size of the test space (measured, for example, by the number of states the microprocessor may assume) was sufficiently small. In addition, early microprocessors typically had fewer functional units than modern microprocessors, and the interactions between the few components and functions were well understood and controlled. The increasing number of functional units in microprocessors is significant from a verification perspective because interaction between functional units can no longer be ignored or only loosely verified by conventional verification methodologies.

The general purpose use of modern integrated circuits makes it impossible to predict and plan for the type of software applications that will run on them and thus the state and interdependence that will be exercised in the field are rather large and generally non-deterministic. Roughly speaking, the test space of a microprocessor is approximately equal to $2^n$ where n represents the number of latches(state storage devices) within the microprocessor. From this approximation, it will be appreciated that the test space of microprocessors increases exponentially as the number of latches is increased.

The conventional approach to functional verification, in which increased complexity in a device is verified by simply increasing the number of tests that are simulated, is rapidly becoming unfeasible. The simulation process itself is resource intensive. In addition, because the input to a simulator in a conventional verification process is simply a large number of deterministic tests or randomly generated tests, the output of the simulation must be painstakingly evaluated to determine whether a particular simulation was successful in testing the intended functionality of the device.

It would, therefore, be highly desirable to implement a verification system in which the test specification produced by a test generator is evaluated in terms of the functional coverage value-add prior to simulation in an effort to reduce the number of tests that are actually simulated and to ensure that the tests that are simulated are likely to achieve additional verification of the device. Such a capability will result in more focused verification, shorter verification cycle and more efficient utilization of costly simulation cycles. In addition, it will provide a mechanism for more meaningful measurement and monitoring of the verification process, resulting in better scheduling and coordination with other design and manufacturing tasks.

SUMMARY OF THE INVENTION

The problems identified are addressed by an integrated circuit functional verification method and system as disclosed herein. The method includes generating a test description comprising a set of test cases. The functional coverage achieved by the test description is then determined. The functional coverage achieved is then compared against previously achieved functional coverage and the test description is modified prior to simulation if the test description does not offer a delta coverage value add.

Rather than loosely coupled randomly generated test cases, this invention provides the architecture and method for coverage-directed pseudo random test generation for measurable targeted functional verification. In one embodiment, generating the test description comprises generating a test specification and providing the test specification to a test generator suitable for generating the test description. In one embodiment, the test description comprises a generic (i.e., generic format) test description and the generic test description is formatted according to a project test format specification if the coverage achieved by the test description satisfies the test specification.

In one embodiment, the functional coverage achieved by the test description is displayed in a graphical format. The test description is preferably added to a regression test database if the coverage achieved by the test description satisfies the test specification. Determining the functional coverage achieved by a test description may include estimating the coverage achieved based upon the test description, the test specification, a project specification comprising a high level model of the integrated circuit and coverage knowledge base.

The system according to the present invention preferably comprises a test generator, a coverage estimator, and a test coverage analyzer. The test generator is suitable for receiving a test specification and generating a test description responsive thereto. The coverage estimator is adapted to generate a test coverage metric indicative of the functional coverage achieved by the test description. The coverage estimator includes a coverage analyzer which performs high level simulation of the test description to generate a coverage signature.

In one embodiment, the system further includes a test specification optimizer configured to receive a test specification and adapted to produce an optimized test specification based on inputs from the coverage estimator and a project specification comprising a high level model of the integrated circuit. The optimized test specification is preferably adapted to produce a test description that achieves functional coverage of the integrated circuit that is equal to or greater than the functional coverage achieved by the original test description.

In one embodiment, the test generator generates a generic test description and the system includes a formatter adapted to modify the generic test description based on project specification information. In one embodiment, the coverage estimator utilizes a rule base indicative of a mapping between a test specification and a coverage model. The rule base is utilized to map the generic test description to a set of coverage states.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

The present invention contemplates various methods and processes for generating test cases (test programs) for functional verification of an integrated circuit such as a microprocessor. Portions of the invention may be implemented as a set of instructions recorded on a storage medium and suitable for execution by a computer or data processing system or a network of such systems. The storage medium may comprise a system memory of the data processing system, a hard disk, floppy disk, CD ROM, magnetic tape, or other appropriate storage device.

Figure 1:
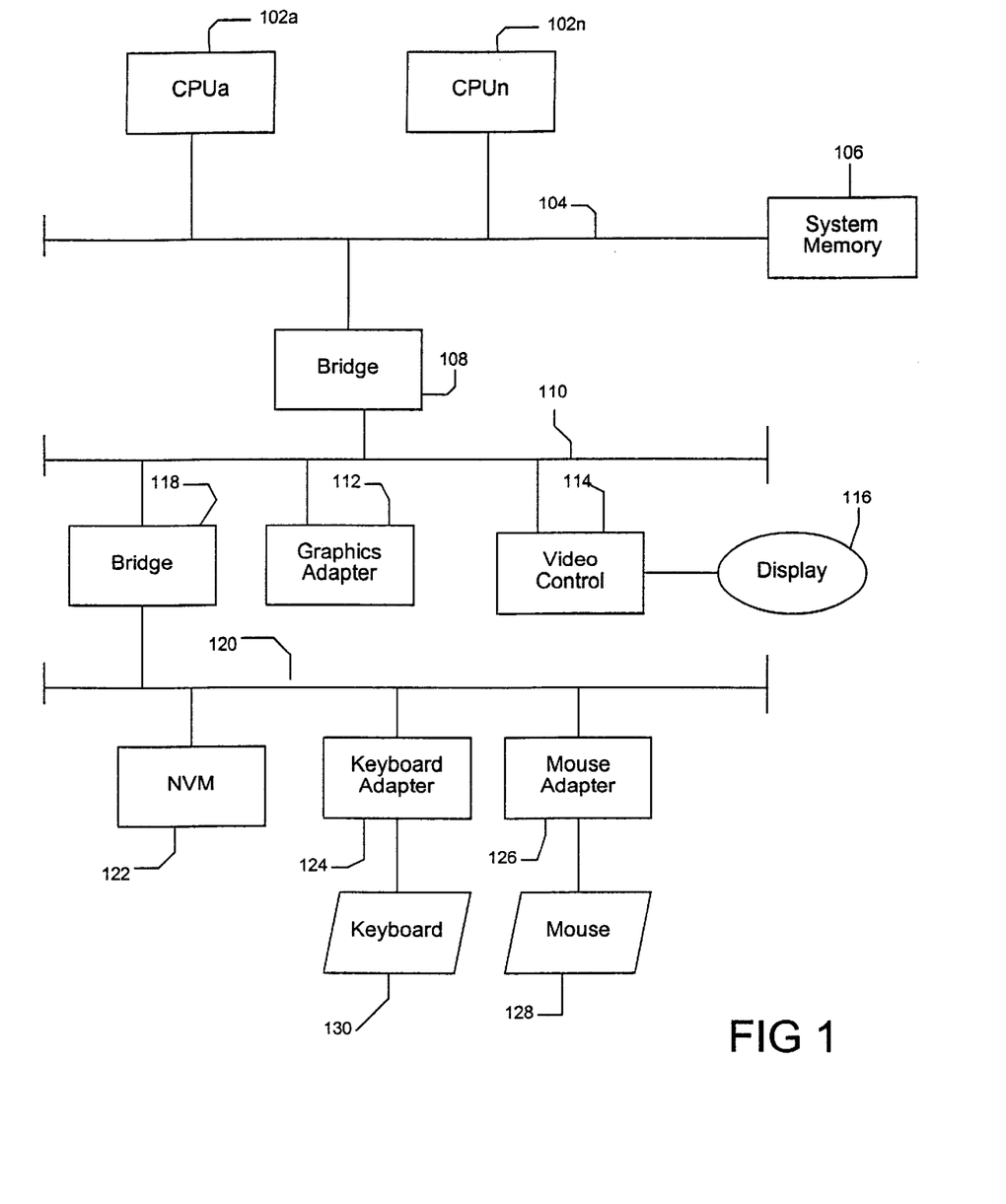
FIG. 1 is a block diagram of a data processing system suitable for implementing the verification system of the present invention.

Turning now to FIG. 1, a block diagram of selected elements of a data processing system 100 suitable for use with the present invention is presented. The depicted embodiment of system 100 includes one or more processors 102a ... 102n (generically or collectively referred to herein as processor(s) 102) coupled via a system bus 104. The processors 102 may comprise any of a variety of commercially distributed processors including, as examples, PowerPC® processors from IBM Corporation, x86 family processors from Intel Corporation, or 68000 family processors from Motorola.

A system memory 106, typically implemented as an array of dynamic RAM's, is accessible to processors 102 via system bus 104. A first bridge 108 of system 100 provides an interface between system bus 104 and a first peripheral or I/O bus 110. A wide variety of I/O devices may be coupled to first I/O bus 110 including hard disk controllers, audio adapters, and high speed network controllers for embodiments in which system 100 comprises one of multiple interconnected systems in a computer network.

First I/O bus 110 is preferably compliant with any of a variety of high performance industry standard I/O bus architectures including the PCI, MCA, AGP, or EISA bus architectures. In the implementation of system 100 shown in FIG. 1, a graphics adapter 112 and video controller 114 are coupled to first I/O bus 110. The depicted embodiment of FIG. 1, further includes a second bridge 118 that provides an interface between first I/O bus 110 and a second I/O bus 129 thereby providing a path between second I/O bus 120 and system bus 104. Second I/O bus 120 is preferably compliant with various industry standard bus architectures including the ISA and PCI bus architectures. In one configuration, first I/O bus 110 is a PCI bus while second bus 120 is an ISA bus.

In the depicted embodiment, a non-volatile memory device (NVM) 122 is coupled to second I/O bus 120. NVM 122 is preferably configured with a set of computer instructions executable by processors 102. NVM 122 is preferably implemented as a flash memory device desirable for its combination of non-volatility and programmability. In the preferred embodiment, the set of computer instructions contained in NVM 122 includes a boot code sequence suitable for transitioning computer system 100 from an idle state to a functional state following a system reset. The boot code sequence typically includes code suitable for loading the operating system software and may further include the system's basic input/output system (BIOS).

BIOS is utilized in conjunction with certain operating systems such as the Windows® operating system from Microsoft and the OS/2® operating system from IBM Corporation and includes low level microcode that controls the I/O device hardware such as the disk drives of system 100. Detailed BIOS information may be found in Croucher, *Que's BIOS Companion* (MacMillan 1998). Additional information regarding the OS/2 operating system is available in *OS/2 Version* 2.1 *Facts & Features* (Order No. G326-0169-04) from IBM Corporation.

In alternative embodiments, system 100 may be implemented in conjunction with non-BIOS based operating systems such as JavaOS and other suitable network based operating systems. Regardless of software implementation, system 100 further includes conventional input devices such as a keyboard 130 and mouse or other suitable pointing device 128 coupled to host bus 104 (via I/O busses 110 and 120) through keyboard adapter 124 and mouse adapter 126 respectively.

Figure 2:
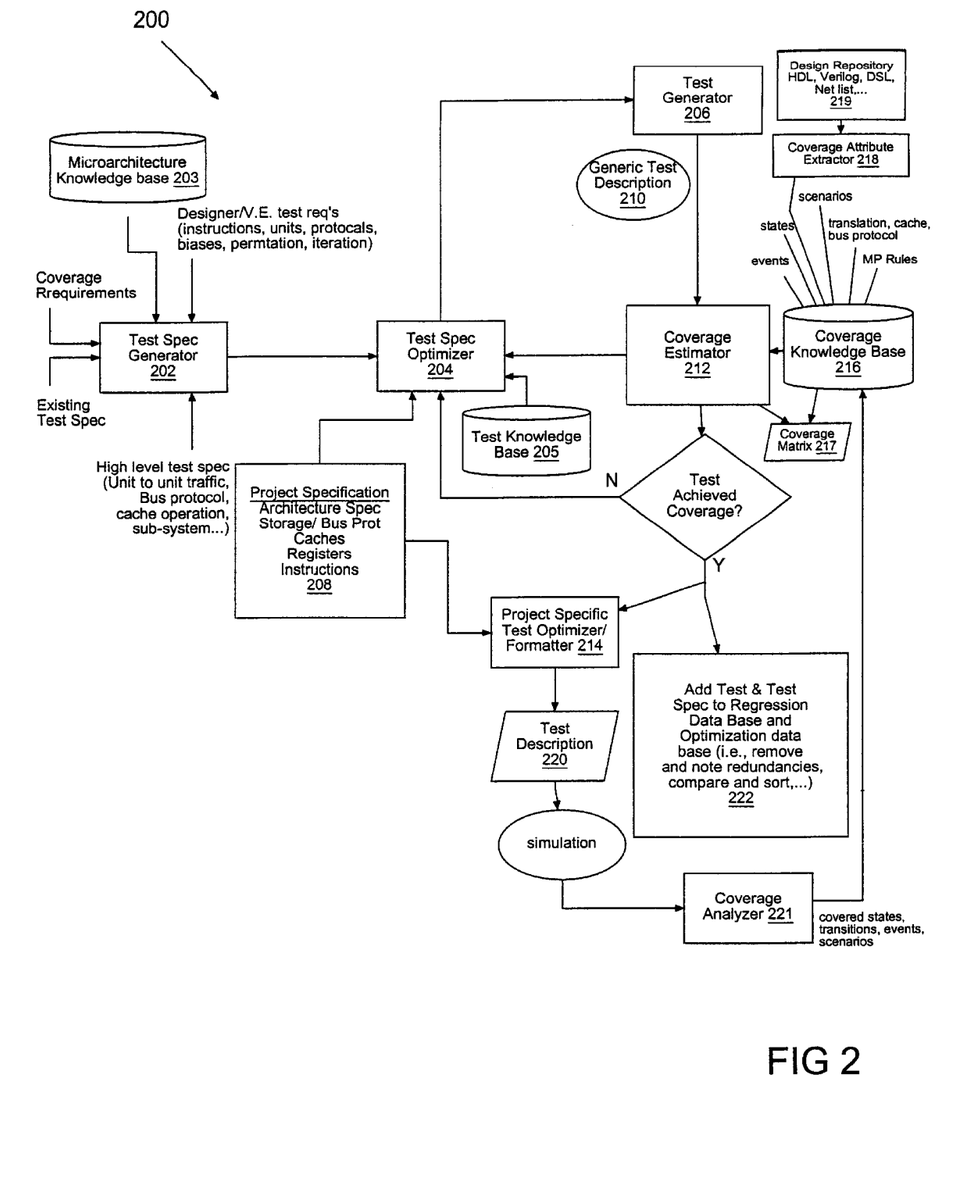
FIG. 2 is a block diagram emphasizing the major architectural components of a verification system according to one embodiment of the present invention.

Turning now to FIG. 2, a block diagram emphasizing the major architectural components of a system 200 suitable for generating test programs to verify the functional design of an integrated circuit is presented. Although, the present disclosure assumes a microprocessor as the integrated circuit that is to be verified, it will be appreciated that other integrated circuits such as an application specific integrated circuits (ASICs), digital signal processors (DSPs), analog-to-digital converters (A/Ds), and digital-to-analog (D/As) may be verified with the present invention as well.

Conceptually, system 200 contemplates a method of generating test cases that includes a coverage analysis process whereby a given test case is analyzed for the functional coverage that it provides prior to running the test case on a simulator. If a particular test case generated by a test generator does not provide adequate additional functional coverage of the microprocessor or other integrated circuit under consideration, the test case is not run on a simulator. In this manner, the present invention contemplates optimizing test cases prior to simulation in an effort to address the increasing cost and time required to verify microprocessors and other complex integrated circuits. If a test generated by a test generator does not provide additional functional coverage of the microprocessor being verified, system 200 refines or discards the test in favor of tests that provide additional coverage.

By focusing the test generation process on the coverage provided by the test, system 200 is distinguishable from verification by simulation methodologies (cycle-based and deterministic methodologies) in which it is presumed that the greater the number of random or deterministic test cases that are generated, the greater the functional coverage achieved (statistical coverage) or the greater the number of design specifications exercised, the greater the coverage (specification-based coverage), or the greater the number of resources exercised, the greater the coverage (program-based coverage). System 200 provides a coverage-based test generation by systematically directing and monitoring the generation and specification optimization process to cover all functional features of the architecture and microarchitecture.

As depicted in FIG. 2, system 200 includes a test specification generator 202 that provides input to a test specification optimizer 204. The test specification optimizer 204 converts a test specification received from test specification generator 202 to an optimized test specification that is forwarded to a pseudo random test generator 206. The test specification generator 202 receives inputs from traditional test generation sources such as, for example, inputs from a verification engineer, inputs from existing tests, inputs from a high level test specification, and inputs regarding the coverage requirement specification as well as a microarchitecture knowledge base 203 which provides all basic and known microarchitecture features to be covered (included) in test specifications.

Typically, test specifications are geared to a specific integrated circuit function, unit, set of instruction, bus protocol, memory coherency, control flow, data flow, etc. As an example, a test specification written by a verification engineer may specify that the engineer wants to verify that we can read/write very large numbers from/to every register in the microprocessor. This initial test specification description is output from test specification generator 202 and received by test specification optimizer 204, which optimizes the test specification description based, in part, upon project specification information (instruction formats, instruction names, register names and types, etc.) and test knowledge (range, value, and format of large numbers for the design) 205.

Test specification optimizer 204 is configured with test knowledge base 205 regarding test generator 206 such that the optimized test specification generated by test specification optimizer 204 is in a format suitable for use with a particular test generator 206. Including knowledge regarding test generator 206 into test specification optimizer 204 beneficially removes a significant burden on the verification engineer. More specifically, in the absence of test specification optimizer 204 in conjunction with test generator 206, the verification engineer must typically spend a significant amount of time and energy learning the details of a specific test generator. As soon as a well understood test generator is modified or replaced, all the information learned by the verification engineer concerning the previous test generator becomes obsolete. Delegating the task of optimizing test specifications for specific test generators to test specification optimizer 204 enables the verification engineer to focus on the task of defining test specifications that will provide new and useful information regarding the functionality of the microprocessor. The test generator 206 as described here can be classified as a pseudo random test generator which can be directed (navigated via biasings and control parameters) and influenced in how and what test programs are generated.

To illustrate the operation of test specification optimizer 204, imagine that test specification generator 202 generates, in response to inputs received from a verification engineer, existing test specifications, and coverage requirements, a test specification indicating that all registers in the microprocessor are to be tested for functionality with respect to floating point numbers. Based on project specific information indicated by reference numeral 208 in FIG. 2, test specification optimizer is configured to produce an optimized test specification to the test generator 206. In the example of a test specification to verify that all registers are functional with floating point numbers, the test specification optimizer 204 produces a test specification specific to a particular architecture, storage bus protocol, cache implementation, register set, instruction set, etc.

Thus, if the project specification 208 indicates that the integrated circuit being verified includes 32 registers, for example, the optimized test specification provided to test generator 206 may indicate that the user wants to verify the floating point number functionality of registers 0 through 31. (Throughout this disclosure, "user" refers to a verification or design engineer that utilizes system 200 to verify the functionality of a specific device. The various software components that comprise system 200 described herein including microarchitecture knowledge base 203, project specification 208, test knowledge base 205, coverage knowledge base 216, and test optimizer formatter 214 are typically developed by a tools group that supports the design verification).

In addition, the project specification 208 may indicate value ranges and types that a specific integrated circuit treats as a floating point number such that the optimized test specification provided to test generator 206 incorporates this additional information. If, for example, a particular integrated circuit treats numbers that are greater than $10^{10}$ as very large numbers, the optimized test specification may indicate that the user wants to verify the functionality of register 0 through 31 with numbers greater than $10^{10}$.

The test generator 206 receives the output of test specification optimizer 204 and generates a test description. In the preferred embodiment, the test description generated by test generator 206 comprises a set of test cases (identified as generic test description 210 in FIG. 2).

In conventional verification systems, test generators typically generate test cases that are specific to a particular verification and simulation environment. Removing the environment specific information and test format from test generator 206 increases the portability of test generator 206. In other words, it is unnecessary to continually modify test generator 206 for each new verification and simulation environment. In addition, only one set of tools and functions need to be developed for processing and analyzing output of the generator, regardless of the specifics of the integrated circuit being verified. Furthermore, removing the specific test format requirements from the generation process, allows reuse of test specification optimizer 204 and coverage estimator 212 (described below) across various architectures, designs and design environments.

Test specification optimizer 204 also receives feedback from a coverage estimator 212. The coverage estimator 212, as described in greater detail below, analyzes test description 210 against an overall design coverage model and identifies various indicia of functional coverage with respect to the integrated circuit. Coverage estimator 212 provides feedback to test specification optimizer 204 regarding the potential coverage achievable by the test description 210.

Coverage knowledge base 216 maintains information regarding the functional coverage achieved by previously generated test descriptions and includes a set of rules that coverage estimator 212 applies against a test specification produced by test specification optimizer 204 as well as against a generic test description 210 generated from a specific test specification. The coverage knowledge base rules generate a set of actions and explanations that are used by test specification optimizer 204 to further optimize the test specification based on accumulated similar tests and knowledge gained from previous designs and previous tests generated for the current design. In addition, coverage knowledge base 216 includes all coverage criterion such as events to be covered, transitions to be observed, composite scenarios to be exercised, bus and cache activities that have to be generated by tests and microarchitecture features to be exercised.

Various inputs to coverage knowledge base 216 (such as the events, states, and scenarios depicted in FIG. 2) may be input by a verification engineer. Other inputs to knowledge base 216 may be automatically generated. The depicted embodiment illustrates the automated extraction of coverage attributes from a repository 219 of design information. Repository 219 may include a design description in a hardware description language (HDL) such as VHDL or Verilog® (a registered trademark of Cadence Design Systems, Inc.).

Thus, test specification optimizer 204 and coverage estimator 212 function as a model-based system where a dynamic model of a test specification is optimized based on a coverage information. Because there is no simulation result available to the coverage estimator, it functions based on a coverage model of the design. Inputs from coverage estimator 212 are converted to new test specification attribute values. These new values are then checked against design/architecture data base information in project specification 208 for validity and conformance.

Test specification optimizer 204 may generate confidence factors assigned to each test specification attribute. These confidence factors can trigger validation and optimization methods when their value falls below an acceptable threshold for that attribute. If a test specification or test specification attribute is modified as a result of inputs from coverage estimator 212, a "when-changed" method is automatically activated in one embodiment of the present invention. The when-changed method checks the new value or attribute against the test knowledge base 205 to assure that the specification is attainable by the test generator.

Test specification optimizer 204, as indicated previously also consults the project specification data base 208 to insure that specifications are consistent with architecture and design attributes. Attributes such as the instruction set, register set, operand sizes, operand registers, addressing modes, cache line sizes, cache configuration, level of sharing of cache lines between processors, and other suitable attributes are all taken into consideration to optimize the test specification provided to test generator 206.

Thus, it will be appreciated by those familiar with functional verification having the benefit of this disclosure that the method and system for generating generic test description 210 including feedback from coverage estimator 212 are utilized in system 200 to refine and focus test descriptions produced by test generator 206 prior to any actual simulation. Although test generator 206 may generate a large number of tests, it is possible that one or more of the generated tests actually provides no new coverage with respect to the test specification under consideration or does not provide the coverage outline in the test specification. Imagine, for example, a test specification designed to determine whether a register R1 can be read and written. Test generator 206 may generate first and second test specifications as follows:

| TEST SPEC 1 | TEST SPEC 2 |
|---|---|
| STORE 100 R1 | ADD 10 40 R1 |
| LOAD R1 | MUL 50 50 R1 |
|  | ADD 0 100 R1 |
|  | LOAD R1 100 |

Because the instructions in the second test specification vary from the instructions in the first test specification, one may assume that additional coverage is being provided by simulating the second test specification. Moreover, in a cycle-based verification scheme, one may assume that the second test case is actually more valuable because it will exercise more simulation cycles. In other words, because the complexity of the second test specification is greater than the complexity of the first test specification, conventional cycle-based verification methods might prefer the second test specification to the first test specification. From the perspective of exercising register RI for read and write functionality, however, the second test specification does not exercise the stated objective even though it exercises functions not covered in test specification 1.

Utilizing the coverage estimator 212 in conjunction with test specification optimizer 204, system 200 will evaluate the second test specification and conclude that, with respect to the test specification under consideration, the second test specification does not provide additional coverage and is therefore unnecessary to simulate. By reducing and focusing the tests that are actually simulated, system 200 contemplates a significant reduction in simulation resources. Resources required to simulate tests generated with a conventional test generator have escalated out-of-control for state of the art microprocessors. The same applies for deterministic test generation methods, where there is no clear and measurable indication that enough tests have been generated or that all functional unit interactions have been covered.

The conventional approach to verifying ever increasingly complex microprocessors has been to generate an ever increasingly large number of test cases and to optimize the performance of the simulator. Unfortunately, the assumption that a greater number of test cases produces a greater assurance that the underlying microprocessor is functional is often incorrect. While a test generator may generate an essentially infinite number of test cases, many of these test cases may produce little or no new coverage of the design. In the case of deterministic test cases, it is not possible for the human test writer to consider all possible inter/intra actions among all the components of a given design. In addition, simulating the test cases and evaluating the simulation results is a resource intensive process that can overwhelm the designer's ability to develop an integrated circuit in a timely and cost effective manner. By reducing the number of test cases that are simulated and focusing those test cases to provide additional coverage, system 200 offers the prospect of gaining control over the verification process to reduce both the time required to adequately verify a given design but also to reduce the simulation and verification resources necessary, and increase the quality and effectiveness of the verification.

Another important benefit of the proposed system is the reusability of the various components of system 200. If there are any changes in a design architecture or its specific implementation, only the corresponding information in microarchitecture knowledge base 203, project specific information 208, coverage knowledge base 216, and design information repository 219 needs to be updated. All other major components of sysetm 200 (i.e. test specification generator 202, test specification optimizer 204, test generator 206, coverage estimator 212, matrix 217, coverage analyzer 221, regression database 222, etc.) remain intact. Tests generated from then on will be consistent with the new design and there is no need for rewriting test specifications, which is a costly requirement in deterministic verification methodologies, as well as existing random test generation methodologies.

Figure 3:
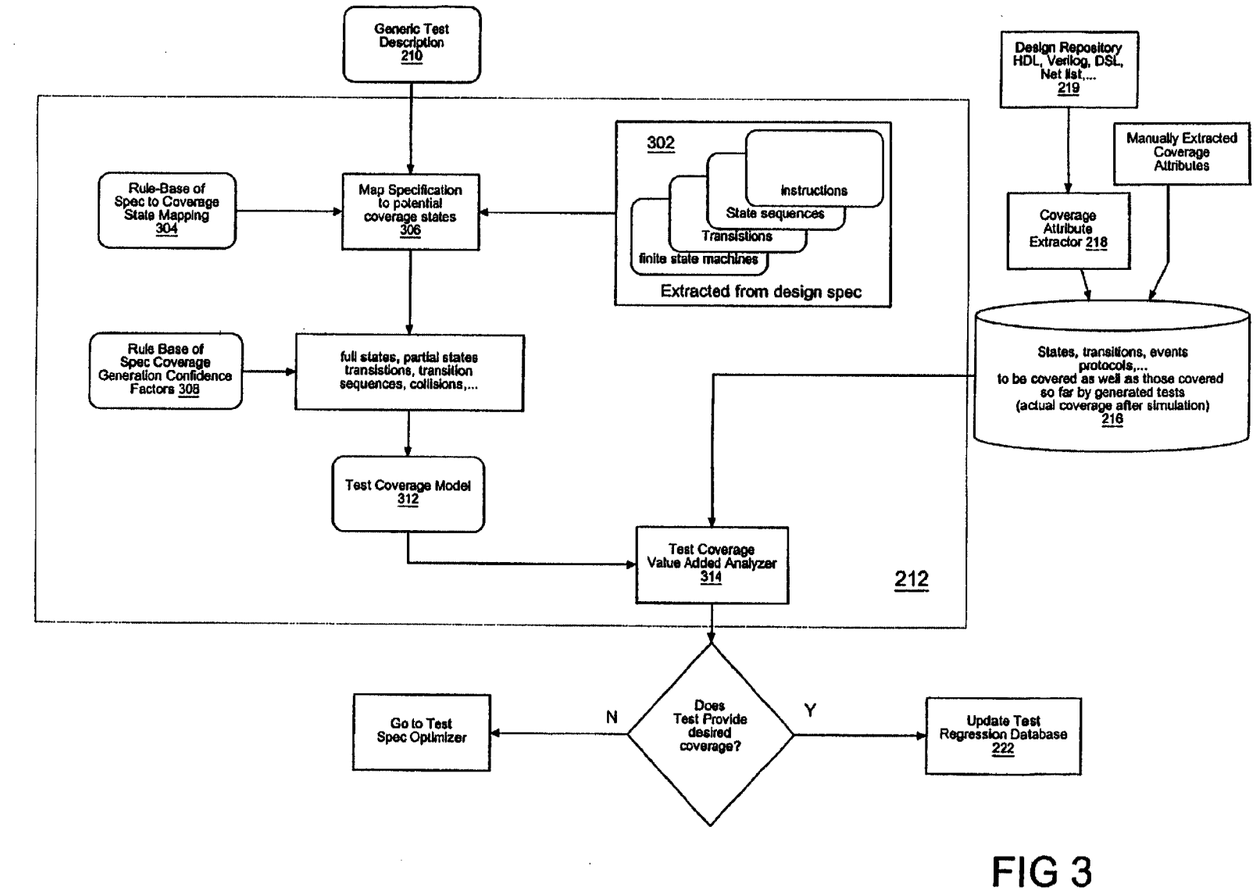
FIG. 3 is a block diagram illustrating additional detail of a knowledge based coverage estimator of the verification system of FIG. 2.

Turning now to FIG. 3, additional detail of coverage estimator 212 and its corresponding knowledge base 216 is illustrated. As depicted in FIG. 3, estimator 212 includes a coverage model 302 that is extracted from the design specification. As its name implies, coverage model 302 is a software representation of the instructions, state sequence, transitions, etc., that the device under consideration might encounter. Thus, coverage model 302 identifies the set of potential coverage states. Estimator 212 further includes a rule base 304 that defines the subset of potential coverage states that a given test specification will cover and a rule base 308 that enables estimator 212 to assign confidence factors to instructions, states, etc., covered by a test description. Coverage model 302, rule base 304, and rule base 308, are typically developed and maintained by a verification support group.

As depicted in FIG. 3, coverage estimator 212 receives a generic test description 210 generated by test generator 206 as its input. Coverage estimator 212 analyzes generic test description 210 against coverage model 302 and rule base 304 to map the test specification to potential coverage states as indicated in block 306 of FIG. 3. The potential coverage states generated by block 306 are then analyzed in conjunction with rule base 308 to determine any full states, partial states, transitions, transition sequences, collisions, bus transactions, cache operations, and so forth that are covered by generic test description 210.

From this information, coverage estimator 212 generates a test coverage model indicated in block 312 that includes a set of confidence factors. The test coverage model 312 is indicative of the states, transitions, events, protocols, and so forth that are likely to be exercised by test description 210. This information is routed to a test coverage value added analyzer 314 of estimator 212 that analyzes the potential test coverage for the test description 210 against test coverage information stored in coverage knowledge base 216.

Coverage knowledge base 216 includes state information, transition information, protocol information corresponding to the coverage already achieved with previously generated tests. Test coverage value added analyzer 314 is configured to determine whether the test coverage model 312 corresponding to the current test description 210 provides any additional coverage to the coverage indicated in the coverage knowledge base 216. If the test coverage value added analyzer 314 determines that test description 210 achieves additional functional coverage of the integrated circuit, coverage knowledge base 216 is updated with the incremental coverage information corresponding to test description 210. If test coverage value added analyzer 314 determines that test description 210 does not provide any additional coverage over the coverage indicated in coverage knowledge base 216, test 210 is discarded and test specification optimizer 204 is invoked to refine the corresponding test specification and send to generator. Alternatively, the test description may be marked as duplicate, redundant, or similar to previous test descriptions and stored in regression database 222. In this manner, coverage estimator 212 is adapted to analyze generic test description 210 with respect to the test specification indicated by the verification engineer and optimized by test specification optimizer 204 and to determine what, if any, new states or transitions are potentially exercised by the test description 210.

In the traditional verification process, it is not known what specific states, transitions, etc., will be covered by the random test generator. In system 200, however, coverage estimator 212 serves as an expert to test specification optimizer 204 as well as the test generator 206. Imagine, for example, a test specification indicates that the verification engineer wants to verify the functionality of the register R with respect to very large numbers. A conventional random test generator typically includes a random number generator that provides the operand and a register value generator that determines the specific register in the test case. Frequently, the output of the random test generator is not known until after simulation. It is possible that the random test generator may generate an instruction that adds the number 25 to register R6 in response to a specification that indicates a desire to verify the functionality of register R1 with very large numbers. Since the test case is not consistent with the test specification, simulation of this test case does not test the desired conditions. By providing information to test specification optimizer 204 about what constitutes a large number and what registers are desired to be covered in the test specification, coverage estimator 212 is able to analyze test description 210 to determine if it is potentially capable of achieving the desired coverage for the test specification. Note that in current test generation environments, the user has to specify the range and scope of large numbers to be used for each test as well as specific registers to be tested. This makes the test useless if the design changes impact registers or data or address ranges.

Returning now to FIG. 2, if coverage estimator 212 determines that generic test description 210 provides additional coverage information, the coverage information from coverage estimator 212 corresponding to test description 210 is analyzed to determine if the generic test description 210 achieves adequate coverage of the test specification produced by test specification optimizer 204. If the test description 210 does not provide sufficient coverage of the test specification, test specification optimizer 204 performs additional processing until a suitable test specification is generated that results in a test description 210 providing the desired test coverage or a predetermined maximum number of trials is reached. When, ultimately, a test description 210 achieves sufficient coverage of the defined test, the test description 210 is forwarded to a project specific test optimizer and formatter 214.

The project specific optimizer and formatter 214 modifies the generic test description 210 according to product specification information 208 and project specific requirement and format. As an example, a generic ADD instruction comprising a portion of generic test description 210 will be formatted in project specific optimizer and formatter 214 according to the instruction set provided by project specification information 208. The output of project specific test optimizer and formatter 214 is a test description 220 that is suitable for input to a specific simulator. Preferably, the simulation results are provided to a coverage analyzer 221 that determines covered states, transitions, events, and scenarios that were covered when test description 220 was simulated. The coverage information determined by coverage analyzer 221 is fed back to coverage Knowledge base 216 where it can by used by coverage estimator 212 in optimizing subsequent test descriptions.

If the generic test description 210 achieves the desired test coverage with respect to the test specification, the generic test description and its corresponding test specification are added to the coverage regression knowledge base 216. By continually updating coverage knowledge base 216 with each test description 210 and its corresponding test specification, subsequent generic test descriptions can be compared against the most current test coverage information.

Figure 4A:
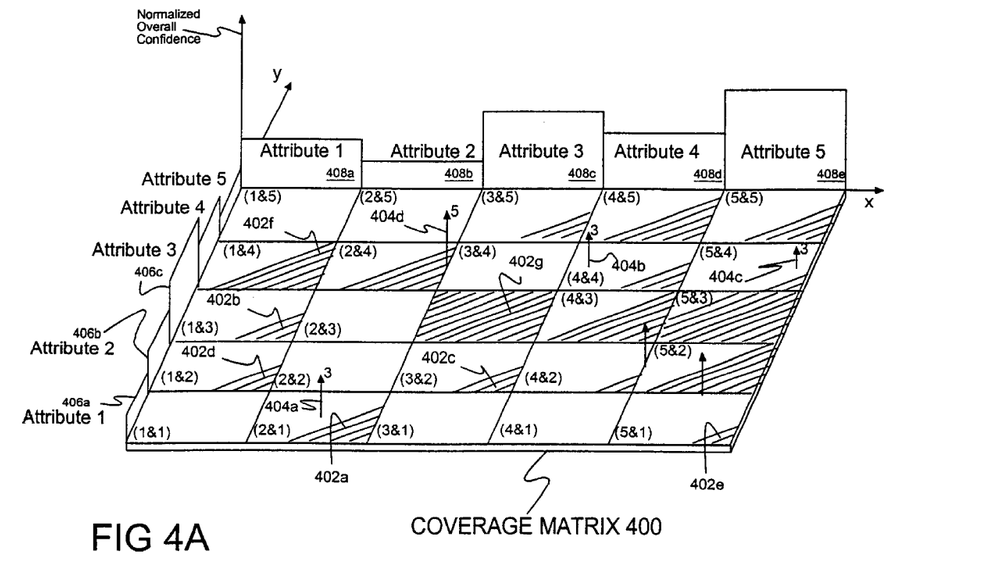
FIG. 4 is a illustrative depiction of a display produced by a verification system of FIG. 2.
Figure 4B:
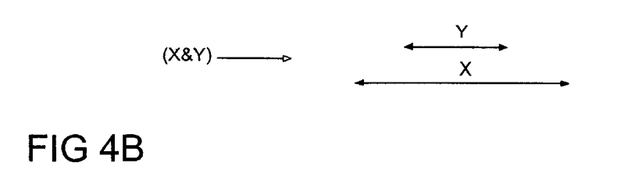

In one embodiment, the system 200 of FIG. 2 includes code to generate a graphical representation or matrix 217 of the test coverage likely to be achieved by a given generic test description 210 as well as the overall functional coverage achieved thus far. Turning now to FIGS. 4A and 4B, a representative illustration of one embodiment of matrix 217 is depicted as the coverage matrix 400. Coverage matrix 400 provides a graphical representation of the functional coverage achieved by a given test description 210 (or a group of test descriptions).

Matrix 400 depicts composite and simple coverage attributes that are likely to be achieved when a particular test description is simulated or a regression bucket is simulated. The system user can rapidly identify coverage attributes (i.e., state, transition, operation, and other interactions) that are likely to be exercised by inspecting coverage matrix 400. Coverage matrix 400 is preferably generated from and updated by the information stored in the coverage knowledge base 216 and coverage estimator 212.

The shaded areas 402a, 402b, 402c, etc., represent the confidence that a pair of coverage attributes will be exercised simultaneously. Shaded area 402a, located at the intersection of attribute 2 along the x axis and attribute 1 of the y axis, represents the confidence that attribute 1 (the y-attribute or dependent attribute) will occur while attribute 2 (the x-attribute or dominant attribute) is being exercised during simulation of a given test description or regression bucket. The notation (2&1) is used to identify the intersection of attribute 2 as the dominant attribute and attribute 1 as the dependent attribute.

Shaded area 402d (1&2), on the other hand, indicates the confidence that attribute 2 (the dependent attribute) will occur while attribute 1 (the dominant attribute) is being exercised. A graphical representation of the notation (A&B) is depicted in where the lower and longer vector represents the occurrence of the dominant attribute (attribute A) while the upper and shorter vector represents the occurrence of the dependent attribute (attribute B). Thus, the notation (A&B) signifies the occurrence of attribute B during the occurrence of attribute A.

The confidence level that a particular combination of attributes covered by a test specification is indicated by the percentage of the box corresponding to the combination of attributes that is shaded. A box that is mostly shaded indicates a relatively high confidence that the corresponding attribute combination will occur whereas a box that is less shaded indicates a relatively low confidence. In one embodiment, a user can click on a shaded area to see the exact numeric confidence factor as well as a list of tests that comprise that confidence.

In addition to shaded areas 402, the depicted embodiment of matrix 400 includes confidence arrows 404a, 404b, 404c, etc. (collectively or generically referred to a confidence arrow(s) 404) that indicate the confidence that a particular attribute is exercised relative to other attributes. In one embodiment, the positioning of a confidence arrow 404 within a box of matrix 400 indicates the relative timing between the attribute under consideration and one or more other attributes.

A confidence arrow such as confidence arrow 404a positioned in the center of its box (2&1), for example, may indicate the confidence that an attribute (attribute 3 in this case) is exercised while attribute 1 and attribute 2 are being exercised. Confidence arrow 404b, positioned at the left side of its corresponding box (4&4) may indicate the confidence that the attribute under consideration (attribute 3) is exercised prior to another attribute (attribute 4 in this case). Confidence arrow 404c, positioned at the right side of its box (5&4) may indicate the confidence that the attribute under consideration (attribute 3) is exercised after a pair of attributes (attributes 5 and 4) are exercised. Confidence arrow 404d, located at the boundary between two boxes (2&4) and (3&4) may indicate the confidence that an attribute (attribute 5) is exercised after a first attribute or first pair of attributes (attributes 2 and 4 in this case) but prior to a second attribute or second pair of attributes (attributes 3 and 4 in this case).

In addition, the depicted embodiment of coverage matrix 400 includes a set of y-attribute cumulative bar graphs 406a, 406b, 406c, etc., (y bar graph(s) 406) and a set of x-attribute cumulative bar graphs 408a, 408b, 408c, etc., (x bar graph(s) 408). Each y bar graphs 406 indicates the confidence that the corresponding y-attribute will occur as a dependent attribute (regardless of the dominant attribute) whereas each x bar graphs 408 indicates the confidence that the corresponding x-attribute will occur as a dominant attribute (regardless of the dependent attribute).

Y bar graph 406a, for example, represents the confidence that attribute 1 will occur as a dependent attribute (i.e., attribute 1 will occur during the time that a dominant attribute is occurring). X bar graph 408a represents the confidence that attribute 1 will occur as a dominant attribute (i.e., that a dependent attribute will occur while attribute 1 is occurring). In this manner, each y bar graph 406 represents the normalized sum of the confidence levels in the corresponding row of matrix 400 (excluding the "diagonal"

boxes, namely, (1&1), (2&2), (3&3), etc.) while each x bar graph 408 represents the normalized sum of the confidence levels in the corresponding column of matrix 400 (excluding the diagonal boxes).

Thus, y bar graph 406a represents the normalized sum of the confidence factors indicated by the shading 402a and 402e while x bar graph 408a represents the sum of the confidence factors 402b, 402d, and 402f. The symmetrical boxes such as box 402g represent the confidence that the corresponding attribute (attribute 3 in this case) will be simulated irrespective of the other attributes. The graphical representation of confidence levels presented by coverage matrix 400 enables a system user to determine rapidly the likely scope of coverage for a given test description, as well as the overall coverage achieved.

Thus, test specification optimizer 204 receives a set of desired test specifications in the form of the original test specification and the achieved test specification. In response, test specification optimizer 204 generates a new set of test specifications such that the test coverage is increased or maintained while the difference between the desired and achieved test specification is decreased. One embodiment of the invention contemplates a delta specification matrix that is utilized by coverage estimator 212 to determine whether the coverage achieved by a given test specification is adequate. In one embodiment, the delta specification matrix includes a list of events and associated min/max specification differences that are acceptable. If the test coverage achieved by a given test description is within the tolerance specified in the delta specification matrix, the test description is then considered acceptable for the associated event.

It will be apparent to those skilled in the art having the benefit of this disclosure that the present invention contemplates a pseudo random directed test generation system suitable for analyzing test cases from a coverage perspective prior to simulation in an effort to improve the efficiency of the generation and simulation process. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A verification method, comprising:
    generating a first test description, simulating the first test description, and storing functional coverage information derived therefrom in a functional coverage database;
    generating a second test description;
    determining the functional coverage achievable by the second test description;
    comparing the functional coverage achievable by the second test description against the functional coverage information stored in the functional coverage database;
    modifying the second test description prior to simulating it if the second test description achieves no incremental coverage; and
    simulating the second test description if the functional coverage achievable by the second test description exceeds the functional coverage stored in the database and storing information indicative of the functional coverage achieved by said simulating in the database.

2. The method of claim 1, wherein generating the second test description comprises generating a test specification and providing the test specification to a test generator suitable for generating the test description.

3. The method of claim 2 wherein the second test description comprises a generic test description.

4. The method of claim 3, wherein the generic test description is formatted based on a project specification if the coverage achieved by the second test description satisfies the test specification to produce a formatted test description suitable for simulation, in a specific verification/simulation environment.

5. The method of claim 1, further comprising graphically displaying the functional coverage achieved by the second test description.

6. The method of claim 1, further comprising adding the second test description's corresponding coverage attributes to the functional coverage database if the coverage achieved by the second test description satisfies the test specification.

7. The method of claim 1, wherein determining the functional coverage achieved comprises estimating the coverage achieved based upon a generic test description, the test specification, and a design architecture specification comprising a functional and coverage model.

8. A system for generating a test description for use in verifying an integrated circuit design, comprising:
    a test generator suitable for receiving a test specification and generating a test description responsive thereto;
    a coverage estimator adapted to generate a test coverage model indicative of the functional coverage achievable by the test description; and
    a test coverage analyzer configured to analyze the test coverage model corresponding to a test description and to compare the estimated coverage against a coverage database storing functional coverage information indicative of functional coverage achieved during simulation of a prior test description;
    an optimizer to modify the test description prior to simulating it if the test description does not achieve functional coverage in excess of the functional coverage in the database; and
    means for simulating the test description if the test description achieves functional coverage in excess of the functional coverage and for storing the information indicative of the functional coverage achieved therefrom in the database.

9. The system of claim 8, wherein the optimizer is configured to receive a test specification and adapted to produce an optimized test specification based on a project specification and simulation environment requirements.

10. The system of claim 9, wherein the optimized test specification is adapted to produce a test description that achieves functional coverage of the integrated circuit that is equal to or greater than the functional coverage achieved by the non-optimized (original) test description.

11. The system of claim 8, wherein the test generator generates a pseudo random generic (format) test description according to specified test specification, biases and its corresponding coverage attributes.

12. The system of claim 11, further comprising a formatter adapted to convert the generic test description based on project specification information and the simulation environment requirements.

13. The system of claim 8, wherein the coverage estimator receives a rule base indicative of a mapping between a test specification and a coverage mapping and wherein the coverage estimator utilizes the rule base to map the generic test description to a set of coverage states.

14. A data processing system comprising a processor, a storage device, input means, and a display, the storage device configure with a set of instructions executable by the processor, the set of instructions comprising:

test generator means for generating a test description from a test specification;

coverage estimator means for determining the functional coverage achievable by the test description;

means for comparing the functional coverage achievable by the test description against functional coverage information stored in a functional coverage database and indicative of the functional coverage achieved by simulation of a prior test description;

means for modifying the test description prior to simulating the test description if the test description achieves no incremental coverage; and means for simulating the test description and for storing functional coverage information derived therefrom in the functional coverage database.

15. The system of claim 14, wherein the test generator means comprises means for generating a test specification and means for providing the test specification to a test generator suitable for generating the test description.

16. The system of claim 15 wherein the test description comprises a generic format test description.

17. The system of claim 16, wherein the generic test description is formatted based on a project specification if the coverage achieved by the test description satisfies the test specification to produce a formatted test description suitable for simulation.

18. The system of claim 14, further comprising graphically displaying the functional coverage achieved by the test description.

19. The system of claim 14, further comprising adding the test description to a coverage database if the coverage achieved by the test description satisfies the test specification.

20. The system of claim 14, wherein determining the functional coverage achieved comprises estimating the coverage achieved based upon the generic test description, the test specification, and a design architecture specification comprising a functional coverage model of integrated circuit.

* * * * *